(12) United States Patent
Jiang et al.

(10) Patent No.: US 8,312,051 B2
(45) Date of Patent: Nov. 13, 2012

(54) INCREMENTAL CONSTRUCTION OF SEARCH TREE WITH SIGNATURE POINTERS FOR IDENTIFICATION OF MULTIMEDIA CONTENT

(75) Inventors: Wenyu Jiang, San Francisco, CA (US); David N. Lathrop, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 64 days.

(21) Appl. No.: 12/666,135

(22) PCT Filed: Jun. 20, 2008

(86) PCT No.: PCT/US2008/007686
§ 371 (c)(1),
(2), (4) Date: Sep. 15, 2010

(87) PCT Pub. No.: WO2009/005602
PCT Pub. Date: Jan. 8, 2009

(65) Prior Publication Data
US 2011/0022638 A1 Jan. 27, 2011

Related U.S. Application Data

(60) Provisional application No. 60/937,320, filed on Jun. 27, 2007.

(51) Int. Cl.
*G06F 17/30* (2006.01)
(52) U.S. Cl. .......... 707/797; 707/802; 707/803
(58) Field of Classification Search .......... 707/802, 707/797, 803
See application file for complete search history.

(56) References Cited

U.S. PATENT DOCUMENTS

| | | | |
|---|---|---|---|
| 2008/0165192 A1* | 7/2008 | Finkler et al. | 345/467 |
| 2008/0301646 A1* | 12/2008 | Gupta | 717/127 |
| 2010/0174714 A1* | 7/2010 | Asmundsson et al. | 707/737 |

FOREIGN PATENT DOCUMENTS

| | | |
|---|---|---|
| JP | 2000-172693 | 6/2000 |
| JP | 2001-109471 | 4/2001 |
| WO | 02089002 A1 | 11/2002 |
| WO | 03067467 A1 | 8/2003 |

OTHER PUBLICATIONS

Hoad, T.C., et al., "Detection of Video Sequences Using Compact Signatures", ACM Transactions on Information Systems, vol. 24, No. 1, Jan. 2006, pp. 1-50.

Miller, M.L., et al., "Audio Fingerprinting: Nearest Neighbor Search in High Dimensional Binary Spaces*", Journal of VLSI Signal Processing 41, 285-291, 2005, Springer Science + Business Media, Inc., The Netherlands.

EPO Intl Searching Authority, Notification of Transmittal of The Intl Search Report and The Written Opinion of the Intl Searching Authority, or the Declaration, mailed Mar. 4, 2009.

* cited by examiner

*Primary Examiner* — Hanh Thai

(57) ABSTRACT

Search tree structures with nodes that represent signatures derived from segments of video and audio content are used by systems to identify content and re-establish the correct alignment between video and audio content that have become disassociated with one another. The amount of storage needed to record data representing the tree structure can be reduced by replacing stored signature sets with signature pointers. The efficiency of searches in the tree structure can be improved by constructing and using partial tree structures.

27 Claims, 7 Drawing Sheets

INCREMENTAL CONSTRUCTION OF SEARCH TREE WITH SIGNATURE POINTERS FOR IDENTIFICATION OF MULTIMEDIA CONTENT

TECHNICAL FIELD

The present invention pertains generally to processes and data structures that may be used to organize and search large sets of signatures identifying the content of signals representing stimuli intended for human perception. Two exemplary types of signals are video and audio signals. Throughout this disclosure, the term "video signals" and "video content" refer to signals and content that represent images intended for visual perception and the term "audio signals" and "audio content" refer to signals and content that represent sounds intended for aural perception.

BACKGROUND ART

Applications that seek to identify video or audio signal content, including those that attempt to detect pirated content conveyed by video and audio signals or that attempt to resynchronize disassociated video and audio signals, typically rely on processes that examine signal content to derive sets of signatures that represent and identify the content. For many of these applications, it is important to obtain a reliable identification of signals even when the content of those signals has been modified either unintentionally or intentionally such that the modified content can still be recognized by a human observer as being substantially the same as the original content. If the perceived difference between the content of an original signal and a modified signal is small, then preferably the identification process can derive signature sets from the original signal and from the modified signal that are very similar to one another. A few processes that may be used to derive signature sets for video and audio signals are disclosed in U.S. provisional patent application No. 60/872,090 entitled "Extracting Features of Video and Audio Signal Content to Provide a Reliable Identification of the Signals" filed Nov. 30, 2006 by Regunathan Radhakrishnan, et al., and in U.S. provisional patent application No. 60/930,905 entitled "Deriving Video Signatures That Are Insensitive to Picture Modification and Frame-Rate Conversion" filed May 17, 2007 by Regunathan Radhakrishnan, et al., the contents of which are incorporated herein by reference.

Applications that attempt to identify the content of some test signal typically obtain a large number of reference signature sets representing a library of reference content, arrange the reference signature sets into some type of data structure, derive test signature sets from the content of the test signal, and then search the data structure to determine whether reference signature sets exist that match the test signature sets. If an acceptable degree of matching exists, the test signal content and the corresponding reference content are likely to share a common origin. If the reference content is original content, then the test signal content is deemed to be a copy of the reference content.

For many video and audio applications, the library referred to above contains an extensive amount of reference content and the data structure includes a very large number of signature sets. A very large amount of storage is needed to record all of the signature sets needed to implement the data structure and an extensive amount of processing resources are required to search the data structure.

DISCLOSURE OF INVENTION

It is an object of the present invention to reduce the storage and processing resources needed to implement and search a structure of reference signature sets representing reference content such as images, sounds or other stimuli intended for human perception. It is also an object to facilitate the identification of the location within reference content that corresponds to the matching test content.

According to one aspect of the present invention, test signature sets for test content are compared to reference signature sets for reference content to identify the test content by advancing a selection window along a sequence of reference signatures and modifying a rooted tree structure to reflect a changing membership of reference signature sets that are based on a group of reference signatures within the selection window. The identity of the test content is checked by obtaining a test signature set representing the test content and searching the rooted tree structure to determine if a leaf node exists in the tree that corresponds to a reference signature set and provides a level of similarity with the test signature set that exceeds a threshold.

According to another aspect of the present invention, a tree structures for use in identifying test content is constructed by moving a selection window along a sequence of reference signatures and constructing a rooted tree structure that represents a collection of reference signature sets based on the reference signatures within the selection window, recording a data structure that represents the rooted tree structure, and recording a position index that represents the position of the selection window within the sequence of reference signatures and that refers to the data structure. This is repeated to construct a plurality of rooted tree structures for a plurality of selection window positions and to record data structures and position indexes representing the plurality of rooted tree structures and selection window positions.

According to yet another aspect of the present invention, a medium records data representing a rooted tree structure that includes a plurality of single-level nodes and one or more multi-level nodes each associated with a substring of data elements in a string of data elements representing a sequence of signatures. Each single-level node is associated with a substring of data elements having a fixed length. Each multi-level node is associated with a substring of data elements having a length equal to an integer of two or more times the fixed length. Some of the single-level nodes or multi-level nodes are leaf nodes that are associated with a substring of data elements representing all signatures that constitute a signature set. Pointers are associated with the multi-level nodes and reference locations within the string of data elements representing signatures associated with the multi-level nodes.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

Figure 1:
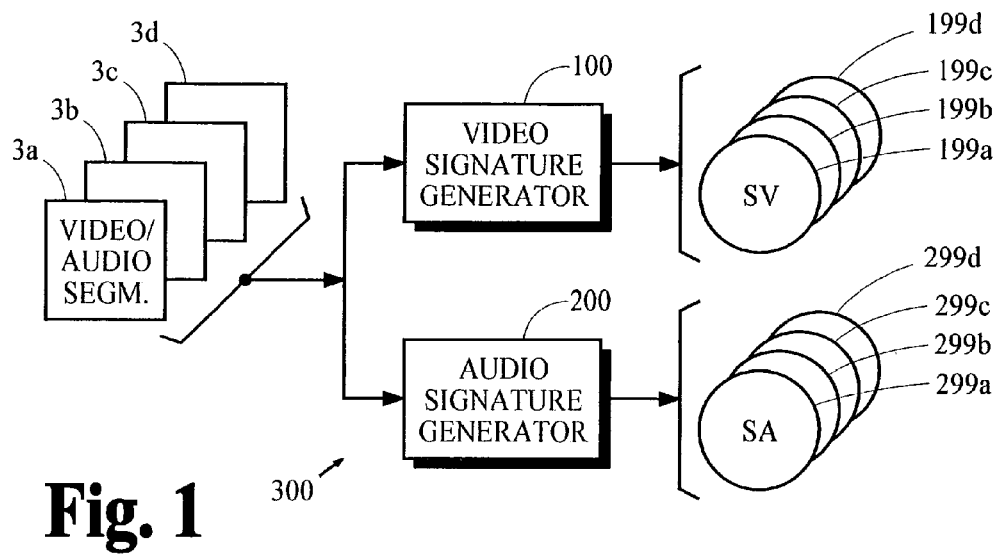
FIG. 1 is a schematic block diagram of a system that may be used to generate video and audio signatures.

FIG. 1 is a schematic block diagram of an exemplary system 300 that may incorporate various aspects of the present invention. The system 300 examines the contents of segments 3a to 3d of a video/audio signal to generate a reliable identification of that signal. In this example, the identification is provided by the video signature generator 100, which generates a set of video signatures (SV) 199a to 199d that identify the video content, and by the audio signature generator 200, which generates a set of audio signatures (SA) 299a to 299d that identify the audio content.

A system like system 300 that generates video and audio signatures for video and audio content is shown only as an example. Aspects of the present invention may be incorporated into other systems that generate signatures for signals that convey content that represents one or more types of stimuli intended for human perception such as visual images, sounds or tactile sensations. Throughout the remainder of this disclosure, more particular mention is made of content that represents visual and aural stimuli.

1. Signatures and Signature Sets

A variety of processes may be used to generate the signatures. Although the choice of the signature generation process may have significant practical consequences on the performance of a system, no particular process is critical in principle to the present invention. For example, the processes that are described in the patent applications cited above can be used to generate video and audio signatures.

In many applications for video and audio content, video and audio signatures are generated from information that is derived from segments of content representing intervals of moving images and sounds. In the example shown in FIG. 1, individual signatures for the video and audio content correspond to individual segments of the video/audio signal. This particular correspondence between segments and signatures is presented only as an example. Other arrangements are possible. For example, a video signature may be generated for a frame of an NTSC video signal representing about 33 msec. of video content and an audio signature may be generated for a block of audio signal samples that represent about 10 msec. of audio content. As another example, a video signature may be generated for a series of frames of an NTSC video signal and an audio signature may be generated for a series of blocks of audio signal samples.

A set of consecutive signatures, sometimes referred to as a "fingerprint" in the relevant arts and referred to herein as a signature set, is intended to identify an interval of content. The reliability of the identification may be improved by using signature generation processes like those discussed in the patent applications cited above to generate signatures that do not change significantly if changes to content have little or no perceptual effect.

Figure 3:
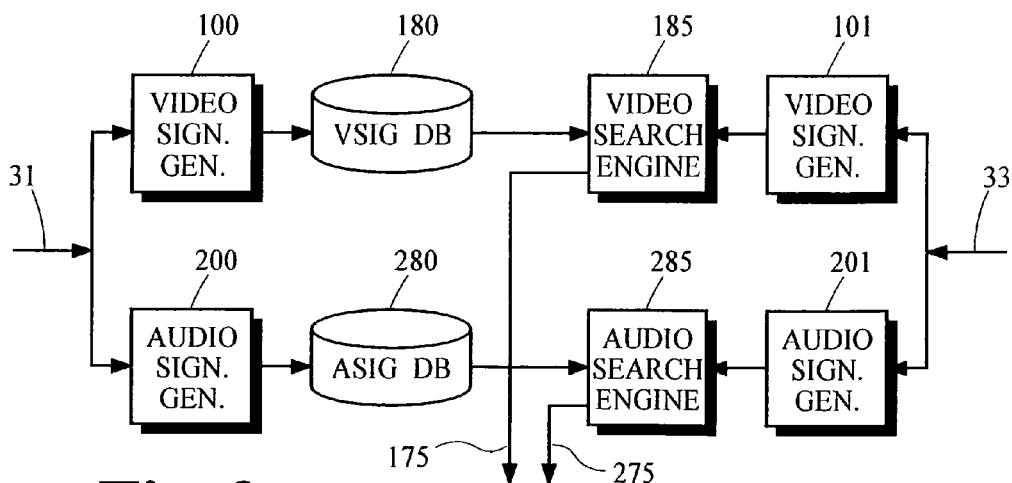
FIG. 3 is a schematic block diagram of a system that manages signature data bases for identifying video or audio content.
Figure 5:
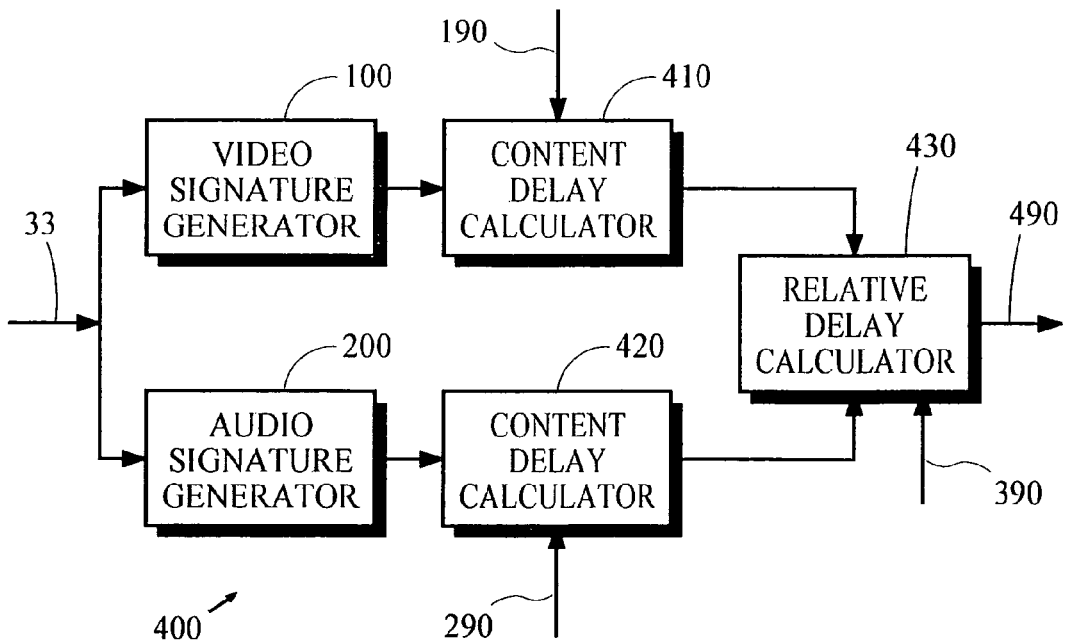
FIG. 5 is a schematic block diagram of part of a system that may be used to restore synchronization between video/audio content streams.

A reliable identification can be used in an identification system like that shown in FIG. 3 to determine whether the content of a particular signal already exists in a library of reference content, and it can be used in a synchronization system like that shown in FIG. 5 to measure and correct errors in time alignment between associated audio and video content. An identification is made by generating one or more signature sets for an interval of content to be identified and then comparing these signature sets with signature sets representing a collection of known content. If a signature set of an interval of content to be identified is equal to or very similar to the signature set of an interval of known content, it is likely the two intervals of content share a common origin and the two intervals are in close alignment.

For ease of discussion, the content to be identified and its associated signatures and signature sets are referred to herein as test content, test signatures and test signature sets, respectively, and the known content and its associated signatures and signature sets are referred to herein as reference content, reference signatures and reference signature sets, respectively.

2. Resolution of Signature Sets

Figure 2:
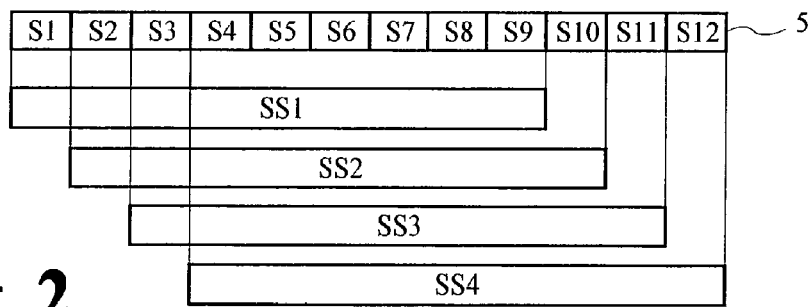
FIG. 2 is a schematic diagram of a sequence of signatures and signature sets.

A close alignment between the test content and the reference content is important to provide a meaningful comparison between the test and reference signature sets. The granularity or resolution of the comparison is limited by the resolution or step size of the process that generates the signature sets. For example, if each audio signature represents 10 msec. of audio content, a collection of signature sets with a resolution of 10 msec. can be achieved by generating a series of signature sets with a step size equal to one signature. An example is illustrated in FIG. 2. In this example, a sequence of signatures 5 comprises twelve signatures S1, S2, . . . , S12 each representing 10 msec. of content. A series of signature sets SS1, SS2, . . . , SS4 each include nine adjacent signatures, which correspond to 90 msec. of content. The extent of each signature set is shown by the narrow lines that mark the beginning and ending of each signature set within the sequence of signatures 5.

In many applications, signature sets are generated that represent a much longer interval of content such as two seconds, for example. The time resolution or granularity of this series of signature sets is controlled by the interval or offset between the starting points of successive signature sets, which in the illustrated example is the length of one signature. Preferably, techniques such as those disclosed in the patent applications cited above are used to generate the signatures for the signature sets such that the closest match between the test and reference signatures corresponds to the smallest error in alignment between the test and reference content.

3. Matching Signature Sets

Many applications implement processes that search for a reference signature set that is similar to but not identical to a test signature set. The signature sets for test content and reference content that share a common origin will generally not be identical for either or both of two reasons. The first reason is that the test content and the reference content may not be identical; one could be a modified version of the other. The second reason is that, even if the test and reference content are identical, the content segments used to generate the signatures may not be exactly aligned. For either or both of these reason, different segments of content are used to generate test and reference signatures; therefore, the generated signatures and signature sets for test and reference content generally will not be identical even if the test and reference content share a common origin. The content of two different signals is said to "share a common origin" if the content of both signals are either identical to each other or differ with one another but represent different versions of the same original content.

Two different signature sets may be said to match if some measure of similarity between the sets exceeds a threshold. One measure of similarity that can be used is the inverse of the Hamming distance between two sets. The Hamming distance between two items of binary data is equal to the number of corresponding bits in the two items that differ with one another. For example, if $X1=010110_2$ and $X2=110011_2$ then the first, fourth and sixth bits in the two values differ and the Hamming distance between $X1$ and $X2$ is equal to three. A Hamming distance between $X1$ and $X2$ that is equal to zero indicates the two items are identical. If a signature set is composed of a sequence of signatures and each signature is represented by a respective string of bits, then the signature set itself can be represented by a concatenation of the bit strings for its constituent signatures. The Hamming distance between two signature sets is the number of differing bits between their two respective bit strings.

In some implementations, the identification and synchronization systems mentioned above attempt to find the reference signature set that provides the best match with a test signature set by finding the reference signature set that has the smallest Hamming distance from the test signature set. Regardless what measure of similarity is used, however, this process generally is not trivial because a very large number of signature sets must be examined in the search for a best match.

4. Data Structure

Some type of data structure for the signature sets and their constituent signatures should be used to facilitate the search. One type of data structure that may be used is known as a rooted tree structure.

A rooted tree structure consists of elements or nodes that are arranged in hierarchical levels and connected to one another by branches or links. A node in one level of the tree is connected to each of one or more nodes at the next lower level in the tree by a link. A node that does not have any node beneath it is referred to as a leaf node. The node that does not have any node above it is referred to as the root node. The links define a unique path between the root node and each leaf node. The process of following a path defined by a series of links is referred to herein as traversing those links.

Figure 6:
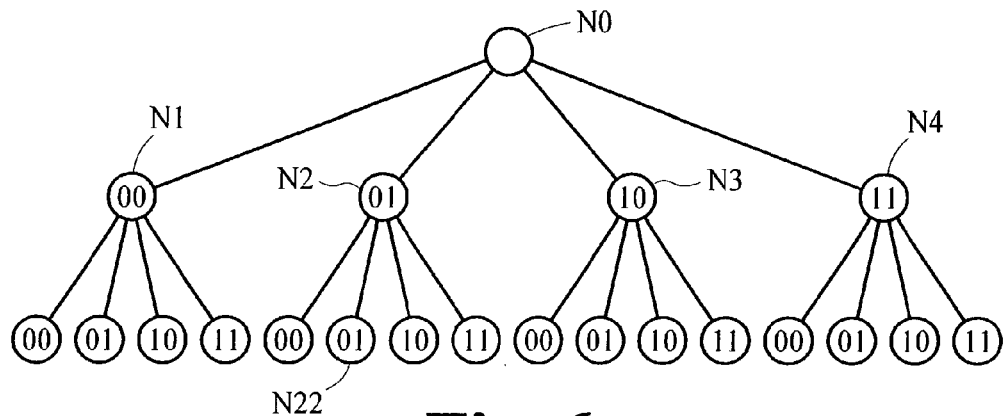
FIGS. 6 and 7 are schematic diagrams of a rooted tree structures.

A rooted tree structure may be used to facilitate a search process by associating some search criterion with each link. Many arrangements are possible. One example of a rooted tree structure is shown in FIG. 6. The nodes of the tree are represented by circles and the links between nodes are represented by lines that connect the circles. This particular tree is symmetric and has sixteen leaf nodes. The search criterion for each link is represented by the symbols that appear in the node attached at the lower end of the link.

The tree shown in FIG. 6 may be used to search for a leaf node that represents a concatenated sequence of two 2-bit numbers. Beginning at the root node N0, a search process compares the first two bits of a search value x with the criteria for the links directly below the root node. For example, the 2-bit search criterion for the link to node N1 is 00. The search process determines which link criterion is satisfied and then traverses that link to the next node. This process continues for lower levels of the tree until a leaf node is reached. If the search value x is equal to 0101, for example, the search process begins at the root node N0 and determines that the criterion 01 for the link to node N2 matches the first two bits of the search value. The process traverses the link to this node and subsequently determines that the criterion 01 for the link to the node N22 matches the next two bits of the search value. The search process traverses the link to node N22 and terminates because this node is a leaf node.

Tree structures need not be symmetric and they need not be "complete" or fully populated with nodes. For example, the tree shown in FIG. 7 corresponds to the tree shown in FIG. 6 but omits some of the nodes and links. The omitted nodes and links are shown with broken lines. If the search value x does not correspond exactly to one of the leaf nodes, the search process can either report there is no matching leaf node or it can identify the leaf node that provides the closest match to the search value. If the search value x is equal to 0000, for example, the search process begins at the root node N0 and determines that the criterion 00 for the link to the node N1 is an exact match to the first two bits of the search value. The search process traverses the link to the node N1 and subsequently determines that the criterion 10 for the node N13 is a closer match for the next two bits of the search value than the criterion 11 for the node N14. The search process traverses the link to node N13 and terminates because this node is a leaf node. The bit string 0010 represented by the leaf node N13 does not exactly match the search value x=0000 but its Hamming distance from the search value is equal to one, which is less than the Hamming distance for any other leaf node in this particular tree. If the inverse of the Hamming distance is used as the measure of similarity, the bit string associated with the leaf node N13 provides the closest match to the search value x.

Each leaf node in a tree structure corresponds to the series of link criteria that are encountered along the path that is traversed from the root node to that leaf node. A particular series of link criteria generally corresponds to one signature set; however, it is possible that the same series of criteria could correspond to more than one sequence of signatures. As a result, a leaf node may correspond to more than one signature set. Each of the intermediate nodes that lie along the path from the root node to a leaf node represents one or more data elements in a string of data elements that constitute the signatures in the one or more signature sets that correspond to the leaf node. If a signature set is represented by a string of binary-valued data elements or bits, for example, then each intermediate node represents one or more bits. The links that descend from a node represent the different values that can be represented by these bits.

In many applications, each signature comprises several bytes of binary data and each signature set comprises a series of hundreds of signatures. For these applications, a convenient implementation of a tree structure associates each intermediate node with eight bits or one byte of binary data in the string of data elements for a signature set. A byte of binary data can represent values from zero to 255; therefore, each intermediate node may have as many as 256 descendant nodes. The number of levels in the tree is equal to the number of bytes of data needed to represent each signature set.

Techniques for storing, constructing and using tree structures are discussed below.

B. Search Tree

1. Storage

Various aspects of the present invention may be used to reduce the amount of storage needed to record data representing a rooted tree structure.

In many applications for video and audio content, a tree structure may have thousands of levels and comprise millions of nodes. A system discussed in Miller at al., "Audio Fingerprinting: Nearest Neighbor Search in High Dimensional Binary Spaces," 2002 IEEE Workshop on Multimedia Signal Processing, December 2002, pp. 182-185, for example, uses signature sets that are 8192 bits or 1024 bytes long. A complete tree with all possible nodes and branches has $2^{8192}=256^{1024}\approx10^{2466}$ leaf nodes. The total number of nodes in the complete tree is also on the order of $10^{2466}$. The amount of storage needed to store data representing such a tree is of cosmic proportions. Fortunately, typical multimedia applications do not require a complete tree.

The representation of a few thousand hours of multimedia content may require a billion of the signature sets described in the Miller paper, which is much smaller than the number of leaf nodes in the complete tree described above. As a result, a rooted tree structure for multimedia applications can be very sparse, especially in lower levels near the leaf nodes. Nevertheless, a billion ($10^9$) is a large number and considerable storage capacity is needed to record a tree structure representing this many signature sets. The techniques described below may be used to reduce the amount of storage needed to record a tree structure for many multimedia applications.

a) Virtual Representation

The examples discussed here assume the intermediate nodes in the tree represent eight bits of signature data. Level one of the tree immediately under the root node may have as many as $(2^8)^1=256$ nodes. Level two immediately under level one may have as many as $(2^8)^2=65,536$ nodes. Level three immediately under level two may have as many as $(2^8)^3=16,777,216$ nodes. If the tree represents one billion signature sets, there will be an average of approximately sixty leaf nodes under each level three node. It is very likely all level three nodes will be present. It is almost certain all level one and level two nodes will be present. In other words, it is very likely a complete tree structure will be needed to represent the nodes in levels one, two and three.

A one-dimensional array may be used to provide an efficient representation of a complete tree structure. Each element of the array corresponds to a node. The elements in the array may be ordered as desired but one convenient implementation reflects a left-to-right, top-to-bottom ordering of the nodes.

Alternatively, these top levels may be represented in a virtual manner rather than by data recorded in storage. Each of the 256 links for a particular node in these top levels can be represented programmatically by the search process as it traverses the links from one level to the next. For example, this technique could be used for the nodes in levels one and two and the nodes in level three could be represented by a one-dimensional array of $(2^8)^3\approx1.6\times10^7$ elements, with each element representing one level three node. If desired, array elements could be allocated only for those nodes that are actually present in a particular tree structure and the presence or absence of a node could be indicated by a set of one-bit flags with a respective flag associated with each node.

The following source code program illustrates one way that a search process can be used with a virtual representation of nodes. This program fragment includes syntactical features of the C++ programming language but it is not intended to be a complete or practical implementation. It is shown merely to illustrate principles. Each statement of the source code is preceded by a number that provides a convenient reference for the following discussion.

```
1   // --------------------------------------------------------------
2   // on the first invocation level set to 1, curNode set to NULL
3   int traversal(Node *curNode, byte *searchValue, int level,
        int dist_sofar, byte *traversed_data)
4   {
5       int i, n;
6       if (level <= 3) {
7           for (n = 0; n < 256; n++) {
8               virt_node[n].byte_val = n;
                // virt_node[n] is array of 256 elements with 2 data fields
9               virt_node[n].dist_thisbyte =
                    Hamming_distance(searchValue[level], (byte)n);
10          }
11          call sort(virt_node[n], virt_node[n].dist_thisbyte);
12          for (n = 0; n < 256; n++) {
13              int dist_new = virt_node[n].dist_thisbyte + dist_sofar;
14              if (dist_new is promising) {
15                  traversed_data[level] = virt_node[n].byte_val;
16                  Node *node_next = NULL;
17                  if (level == 3) {
18                      int idx = 0;
19                      for (i = 1; i <= 3; i++)
20                          idx = (idx << 8) + traversed_data[i];
21                      node_next = &(NodeArray[idx]);
22                      if (node_next->type == nonexistent)
23                          continue;   // skip to next iteration of for loop
24                  }
25                  traversal(node_next, searchValue, level+1,
                        dist_new, traversed_data);
26              } // end of if-dist_new
27          } // end of for-n loop
28  } else {  // level > 3
29          // traverse tree using stored nodes
30  }
31  // --------------------------------------------------------------
```

The routine traversal is a recursively-called subroutine that implements a search process similar to that described in the Miller paper cited above with a virtual representation of nodes in levels one and two of a tree with 256 links per node.

The statement in line 3 defines the entry point of the subroutine. The input parameters include a pointer curNode, an array searchValue of elements that record the signatures in a test signature set to be found by the search, a value level that specifies the current of level of the tree being searched, a value dist_sofar that specifies the total Hamming distance encountered thus far in the search to the current node, and an array traversed_data of elements that record the nodes in the tree that were traversed along the path to the current node. The pointer curNode generally references the current node being searched in the tree structure but its value is not used for the first two levels of the tree where nodes are represented virtually. In this example, this pointer is set to a null value for the first two levels of the tree.

The if-statement in line 6 determines whether the search currently is in levels one, two or three. If not, execution continues with the statement in line 29 that represents a search process such as that described in the Miller paper. If the search currently is in levels one, two or three, execution continues with the for-loop that begins with the statement in line 7.

The for-loop in lines 7 to 10 initializes an array virt_node of elements that provide the virtual representation of 256 nodes that descend from the current virtual node. The elements virt_node[n].byte_val record the search criteria for the descendant virtual nodes. The elements virt_node[n].dist_thisbyte record the Hamming distance between these descendant virtual nodes and the search value.

The statement in line 11 sorts the elements of the array virt_node in ascending order according to the Hamming distance so that the subsequent search for the minimum Hamming distance examines the more promising nodes first.

The for-loop in lines 12 to 27 examines each of the 256 virtual nodes to determine which nodes are good candidates for searching. This examination begins with the statement in line 13 that sets the value dist_new equal to the total Hamming distance accumulated along the search path to the current virtual node virt_node[n].

The if-statement in line 14 determines whether this distance indicates a search along a path to the current virtual node is promising. This may be done by comparing the distance to a threshold as described in the Miller paper. If the distance is too large, which indicates a search to the current virtual node is not promising, execution continues in line 27, which causes the for-loop beginning in line 12 to iterate to the next virtual node. If the Hamming distance dist_new indicates a search to the current virtual node is promising, execution continues in line 15 by updating the array traversed_data to reflect the search is proceeding along the link to the current virtual node. The pointer node_next is initialized to a null value.

The if-statement in line 17 determines whether the search currently is in level three. If not, the current level is one or two and execution continues with the statement in line 25 that makes a recursive call to the traversal subroutine to continue the search at the next level. If the search currently is in level three, execution continues with the statements in lines 18 to 23. The for-loop in lines 19 to 20 concatenates the bytes of data recorded in the first three elements of traversed_data into a 24-bit string that is recorded as an integer value in the variable idx. This value is used as an index for the array NodeArray whose elements record data for each node in the tree structure at level three. Generally, the data structure is complete in levels one, two and three; therefore, the if-statement in line 22 will generally determine the indexed node exists and the search will continue with the recursive subroutine call in line 25. If the level three node does not exist, however, execution continues with the statement in line 23, which causes the for-loop beginning in line 12 to iterate with the next virtual node.

Each recursive call to the subroutine traversal in line 25 ultimately returns to the bottom of the for-loop in line 27, which causes the for-loop to examine the next virtual node at the current level. When all 256 nodes have been examined, the subroutine terminates with the statement in line 30.

b) Compressed Nodes

In many applications, the rooted tree structure is very sparse in the lower levels near the leaf nodes. Generally there are nodes in two or more adjacent levels along a particular path that have only one descendant. The amount of storage needed to record a series of nodes with only one descendant can be reduced by storing data representing a composite or compressed representation of these nodes rather than by storing data representing each individual node. For example, storage is not needed for each node to record the descendant links that do not exist. A series of nodes can be represented by a compressed structure that identifies the first or highest-level node in the compressed structure, the number of nodes or levels that are represented by the compressed structure, and the series of values or link criteria that are encountered while traversing the solitary links between these nodes.

Figure 7:
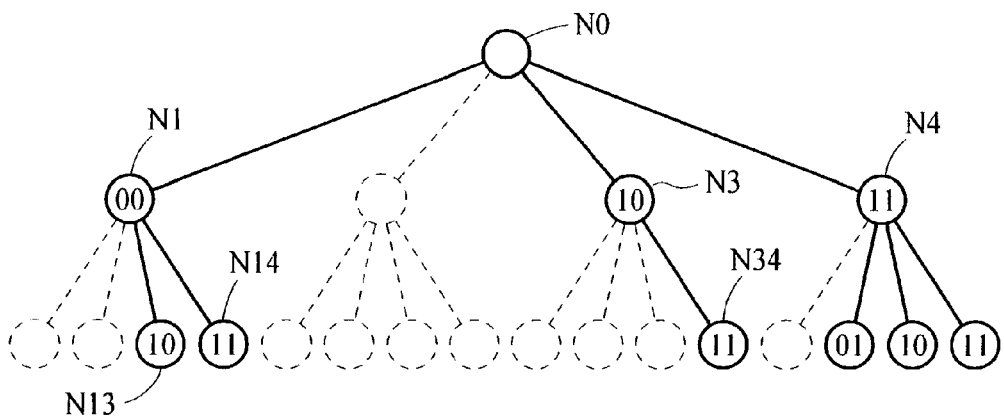
Figure 8:
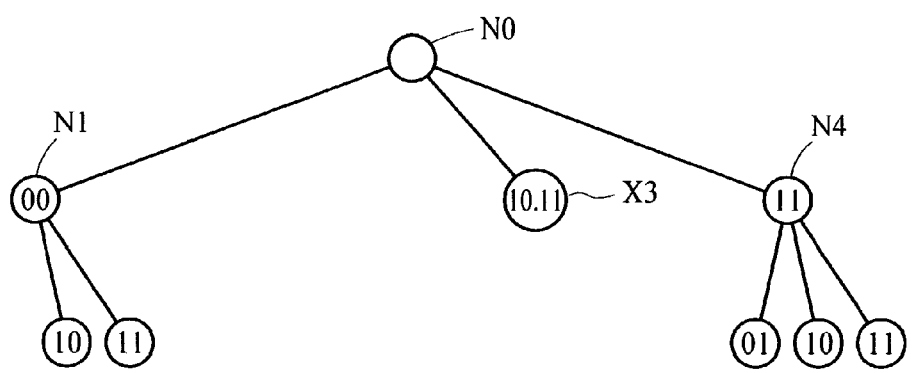
FIG. 8 is a schematic diagram of a rooted tree structure with a compressed node.

Referring to FIG. 7, the node N3 has only one descendant node. The node N3 and its descendant node N34 can be represented by a compressed structure, which is illustrated schematically as node X3 in the tree structure shown in FIG. 8. The notation "10.11" shown in the compressed node X3 represents the series of link criteria 10-11 that is encountered when traversing the links along the path through the nodes N3 and N34.

c) Signature Pointers

The tree structure for many applications represents a very large number of signature sets. In an exemplary implementation for audio content described in the Miller paper cited above, each signature set comprises 1024 bytes of data. If an application records a tree structure with one billion ($10^9$) leaf nodes and a signature set for each leaf node, then more than one terabyte ($10^{12}$ bytes) of storage is needed to record the data that constitute the signature sets.

The data that constitute the signature set for each leaf node of a tree structure is represented implicitly by the sequence of link criteria that is encountered along the path to that leaf node. If a tree structure does not include compressed nodes, or if the compressed nodes include the link criteria as described above, then no additional data is needed to record the signature sets themselves but considerable storage is wasted in many applications because there is a large amount of duplication in the data that constitute the signature sets. This duplication arises from the fact that different signature sets are composed of overlapping series of signatures.

As explained above, a signature set may consist of hundreds of signatures and the step size or offset between the start of different signature sets may be equal to the duration of one signature. If each signature set consists of 200 signatures and the offset between adjacent sets is one signature, then the data for each signature is contained within 200 signature sets. The amount of storage that is needed to record the data for each signature set separately may be 200 times greater than the amount of storage needed to record the data for the entire sequence of constituent signatures.

It may be possible to reduce the storage requirements of a tree by replacing the series of link criteria for each compressed node with a signature pointer that references a location within a string of data elements representing the signatures from which all signature sets are obtained. In many applications, the use of signature pointers can reduce the amount of storage needed to record a tree data structure by 90%.

Figure 9:
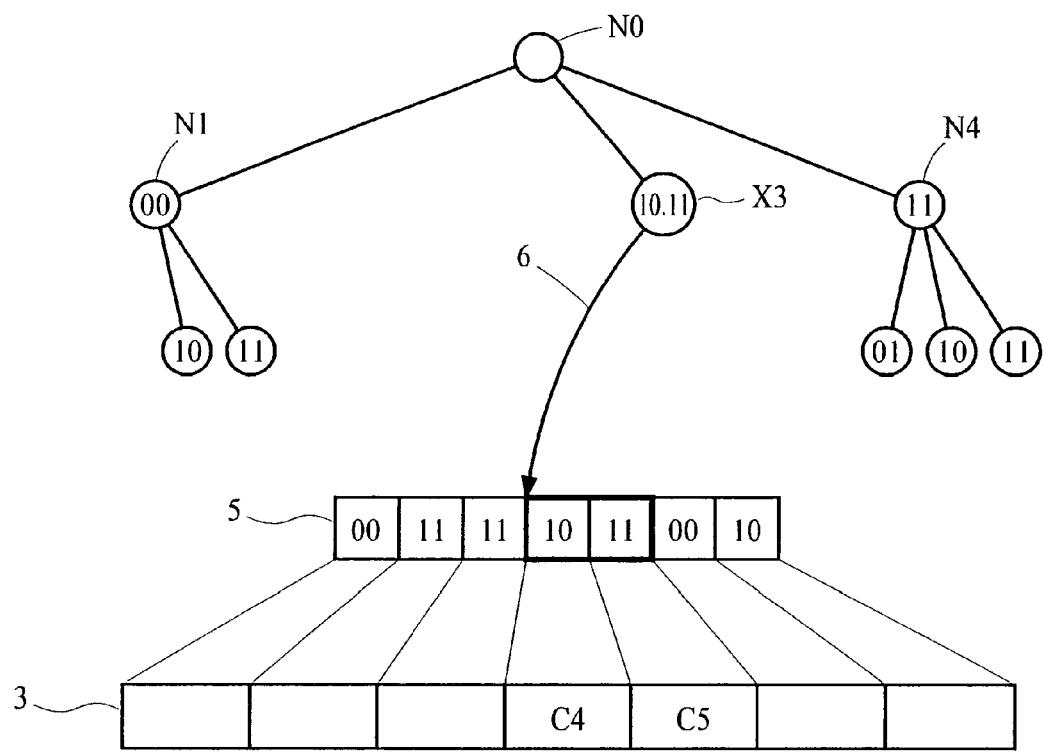
FIG. 9 is a schematic diagram of a rooted tree structure with a compressed node and a signature pointer.

An example is illustrated schematically in FIG. 9. In this example, a string of binary-valued data elements or bits constitutes a sequence of signatures 5 that are represented by the tree structure shown in the figure. Essentially any type of data element including bits, bytes or nibbles may be used as desired. The first signature in the sequence that is shown in the figure is represented by a substring of data elements 00. The compressed node X3 corresponds to the signature set represented by the data elements 1011. This node has a signature pointer 6 that references the location within the sequence of signatures 5 that represents the first signature in the series of signatures associated with the node. Because the compressed node X3 represents all levels of the tree including a leaf node, the series of signatures associated with this node is a complete signature set.

The compressed node shown in the figure terminates with a leaf node. This is not required. Compressed nodes may exist for any portion of the tree structure. An example of a compressed node that does not include a leaf node is illustrated in FIG. 12C.

If desired, a signature pointer may be associated with each leaf node that is not included in a compressed node. This association may simplify the complexity of processes that are used to traverse the tree structure. One way that this may be done is to define all leaf nodes that are not otherwise included in a compressed node to be in a compressed node representing only one node.

2. Location Information

A synchronization system that uses signature sets to measure and correct errors in time alignment between associated audio and video content requires information that establishes the location within the video and audio content that corresponds to each video and audio signature set. This location information may be provided in any way that may be desired. Two ways are described here.

a) Location Field

One way to provide location information for a signature set identifies the location of the content represented by the signature set when the constituent signatures are generated, and records this location in storage that is associated with the leaf node corresponding to the signature set. For example, the location information may be expressed as time in terms of time codes embedded in the content or in terms of a presentation time relative to the start of the content, or it may be expresses as a position such as a frame, block or byte number relative to the start of the content.

b) Location by Signature Pointer

Another way to provide location information for a signature set derives the location of the content represented by the signature set from a signature pointer that is associated with the leaf node corresponding to the signature set. A signature pointer that is associated with a leaf node references the location of the associated signature set within a sequence of signatures. This location relates directly to the relative location of the content segments from which the signatures in the signature set were derived. In one implementation, the signature pointer references the location of the first signature in a signature set. An example of this implementation is illustrated schematically in FIG. 9.

Referring to FIG. 9, each of the signatures in the sequence of signatures 5 was derived from a respective segment of video or audio content within a sequence of content segments 3. The correspondence between content segments and signatures is shown by lines that connect the boundaries between adjacent signatures and adjacent segments of content. The two signatures within the signature set that are shown within bold lines and referenced by the signature pointer 6 were derived from the content segments C4 and C5. The relative location of the content segment C4 within the sequence of content segments 3 may be derived from the location within the sequence of signatures 5 that is referenced by the signature pointer 6.

If each of the signatures within the sequence of signatures is represented by the same number of data elements and the signatures are derived from content segments that begin at positions offset from one another by a constant interval, then the relative location of a content segment within the total content can be expressed as a linear function of the relative position of the corresponding signature within the sequence of signatures. If each signature is represented by M data elements and adjacent signatures are derived from segments of content that are offset from one another by an interval T, then the location L of the content segment that corresponds to a signature may be expressed as:

$$L = \frac{T}{M} p \qquad (1)$$

where p=location of the first data element in the signature.

For example, if each signature comprises M=60 bytes of data and represents T=10 msec. of content, then a location of p=510,000 bytes from the start of the sequence of signatures indicates the corresponding location L in the content is equal to $$L = \frac{T}{M} p = \frac{.01 \text{ sec}}{60 \text{ bytes}} \cdot 510{,}000 \text{ bytes} = 82 \text{ sec}.$$

If the number of data elements M in each signature is expressed in bytes and the location p is expressed in bits, the expression in equation 1 may rewritten as:

$$L = \frac{T}{M} \cdot \frac{p}{8} \qquad (2)$$

A signature location may also be used to derive the location of content corresponding to compressed nodes that begin at an intermediate level in a tree structure. For example, if each node in a tree corresponds to one byte or eight bits of signature data, each signature comprises M bytes of data that were derived from segments of content that are offset from one another by an interval T, and the bit location p references the location of the corresponding signature, then the location of the content that corresponds to the first node in a compressed node may be expressed as:

$$L = \frac{T}{M} \cdot \left(\frac{p}{8} - v\right) \quad (3)$$

where v=level of the first node represented by the compressed node.

In one implementation of a rooted tree structure, each compressed node has a signature pointer that it references the location p of the signature that corresponds to the first node that is represented in the compressed node, and each leaf node has a signature pointer that references the location p of the first signature in the signature set that corresponds to the leaf node. Alternatively, a leaf node may have a signature pointer that references the location p of the last signature in the signature set that corresponds to the leaf node. If desired, a compressed node that includes a leaf node may have two pointers; one pointer references the location of the signature that corresponds to the first node represented in the compressed node and the other pointer references the location of the first or last signature in the signature set that corresponds to the leaf node.

C. Applications

The rooted tree structure that is discussed above may be used in a variety of applications including those that are discussed in the following sections.

1. Content Identification

A few examples of applications that identify content include those that detect unauthorized copies and that confirm the broadcast or reception of specified content.

Networks of peer-to-peer servers can facilitate the distribution of content but they can also increase the difficulty of detecting unauthorized or pirated copies of proprietary content because many copies of the content can exist among the peer-to-peer servers. A facility can automatically determine if any unauthorized copies exist in the network by generating signatures for all the content available from the network and checking these signatures against a data base of reference signatures.

Entities that contract with broadcast networks to distribute specified content can confirm the terms of the contract are met by generating signatures from signals received by a broadcast receiver and comparing these signatures to reference signatures for the specified content.

Entities that provide ratings for broadcast networks can identify content that is received by a receiver by generating signatures from the received signals and comparing those signatures against reference signatures.

FIG. 3 is a schematic block diagram of a system that may be used to implement a variety of applications such as those mentioned above. If desired, a similar system may be implemented for a single type of content such as only audio content or only video content. Referring to the system shown in the figure, the video signature generator 100 and the audio signature generator 200 generate reference video signatures and reference audio signatures from reference video/audio streams of content received from the path 31. The generated reference video signatures are arranged in sets and recorded in the video-signature data base (VSIG DB) 180 and the generated reference audio signatures are arranged in sets and recorded in the audio-signature data base (ASIG DB) 280. The reference signature sets may be recorded with other information that may facilitate implementation of the application such as, for example, data that identifies the content owner, content licensing terms, title of the content or a textual description of the content. The video search engine 185 searches a rooted tree structure representing the reference video signature sets that are stored in the video-signature data base 180. The audio search engine 285 searches a rooted tree structure representing the reference audio signature sets that are stored in the audio-signature data base 280. Either or both of these rooted tree structures may be constructed in advance of their use and recorded in storage or they may be constructed at the time of their use.

The identity of any specified test video content or test audio content may be checked against reference content represented by the signature sets stored in the video and audio data bases. The identity of the test video content may be checked by having the video signature generator 101 generate test video signature sets from the test video content received from the path 33 and passing the test video signature sets to the video search engine 185. The video search engine 185 attempts to find reference video signature sets in the video-signature data base 180 that are exact or close matches to the test video signature sets. The identity of the test audio content may be checked by having the audio signature generator 201 generate test audio signature sets from the test audio content received from the path 33 and passing the test audio signature sets to the audio search engine 285. The audio search engine 285 attempts to find reference audio signature sets in the audio-signature data base 280 that are exact or close matches to the test audio signature sets.

In one implementation, the search engines calculate the Hamming distances between the test signature sets and the reference signature sets stored in the data bases and searches for the reference signature set that is closest to the test video signature set. If the distance between test and reference signature sets is less than some threshold, the test content associated with the test signature set is deemed to be an exact or modified copy of the reference content that is associated with the reference signature set. Empirical results suggest that good results can be obtained for a variety of video and audio content using signature sets that represent about two seconds of content.

In a preferred implementation, all of the video signature sets in the video-signature data base 180 are recorded as a concatenated sequence of video signatures in one string of data elements and all of the audio signature sets in the audio-signature data base 280 are recorded as a concatenated sequence of audio signatures in another string of data elements. The signatures may represent multiple items of content such as multiple motion pictures, multiple scenes in a motion picture, multiple songs, or multiple commercial and political advertisements. If more than one item of content is represented by the sequence of signatures, a table of contents is constructed that identifies the location of the start of each item of content. This table of contents may be used to determine which item of content is referenced by a signature pointer.

For example, suppose a content-identification system has an audio-signature data base 280 that records 150 million audio signatures representing 10,000 songs. The data base records a sequence of all audio signatures in a string of data elements. A tree structure representing the entire sequence of signatures is constructed in advance of or at the time of a search using the techniques discussed above. Each compressed node and each leaf node in the tree structure has a signature pointer that references the location of a respective signature within the string of data elements. A table of contents is also constructed that has 10,000 entries. Each entry in the table of contents corresponds to a respective song and includes a content pointer into the string of data elements that references the location of the audio signature that represents the first segment of content in that song. When the system attempts to identify some test content, it conducts a search of the tree structure to determine if a leaf node exists with a corresponding reference signature set that matches a test signature set. If a match is found, the signature pointer associated with that leaf node is compared to the content pointers in the table of contents to determine which song matches the test content. The entry that has the largest content pointer that is less than or equal to the signature pointer corresponds to the song identified by the search. If the items in the table of contents are sorted in order by location, then a binary search technique may be used to compare the signature pointer with the content pointers.

If the matching leaf node is associated with more than one signature set, one or more additional searches will be needed to identify the song that corresponds to the test content. This may be done in a variety of ways. One way conducts additional independent searches for other test signature sets until a matching leaf node with only one signature set is found. A second way conducts a series of searches, records an indication of those songs that are candidates based on each search, and continues with additional searches until one song is identified from among the candidates that satisfies a plurality of the searches. A third way is similar to the second way but constructs smaller trees for subsequent searches that represent only the signature sets for the candidate songs identified by prior searches.

2. Content Synchronization

Streams of video and audio content are often synchronized with one another when they are recorded or created but synchronization may be lost during subsequent processing. In a television broadcasting system, for example, synchronized streams of video and audio content are often separated into two different paths for signal processing before they are assembled together for transmission. Different processing delays in the two paths can cause a loss of synchronization. The streams can be re-synchronized manually but this is tedious and prone to error. The rooted tree structure with location information described above can be used in systems that restore synchronization automatically. In a broadcast system, for example, synchronization can be restored at any point in the system including at the transmitter just prior to broadcast or at a receiver just prior to listening.

In preferred implementations, signatures are generated from streams of video and audio content when the video/audio streams are known to be synchronized. Alignment information that specifies the time alignment between the video and audio content underlying these signatures is also captured. The video and audio signatures and the alignment information are provided to a "resync device" that is responsible for restoring synchronization between the two streams. The resync device receives streams of the video and audio content after these streams have lost synchronization with one another, generates new signatures along with current alignment information, correlates the newly generated signatures and current alignment information with the original signatures and alignment information, and adjusts the current alignment until proper synchronization is achieved. One way in which this may be done is described below in more detail.

a) Overview

Figure 4:
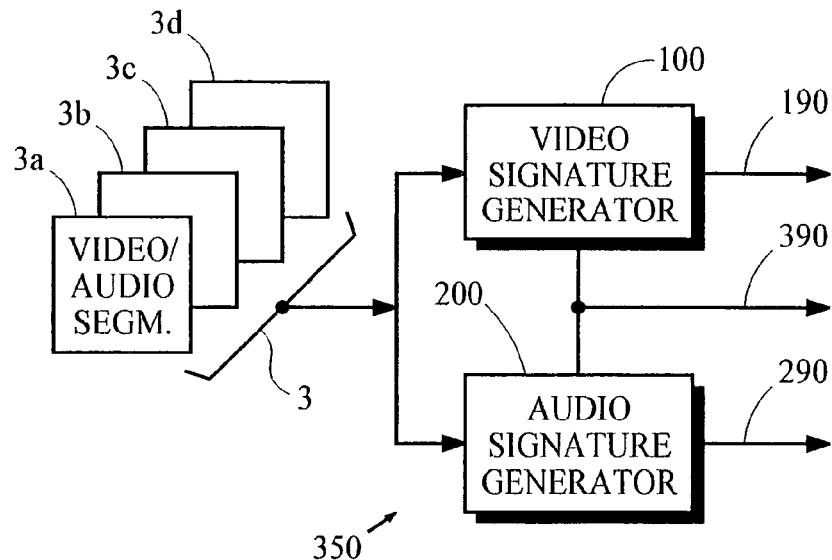
FIG. 4 is a schematic block diagram of a system that captures reference signatures and alignment information for synchronized video/audio content streams.

FIG. 4 is a schematic block diagram of an exemplary capture device 350 that generates video and audio signature sets and alignment information from synchronized video and audio streams. The synchronized video and audio content and streams are referred to herein as reference content and reference streams. The signature sets and alignment information that are obtained from the reference streams are referred to herein as reference signature sets and reference alignment information, respectively. The video signature sets are obtained from the video signature generator 100 and are passed along the path 190 for subsequent use by a resync device. The audio signature sets are obtained by the audio signature generator 200 and are passed along the path 290 for subsequent use by a resync device. Techniques that may be used to generate video and audio signature sets are described in the patent applications cited above.

The capture device 350 also captures alignment information that may be represented in a variety of ways. For example, the alignment information may be implied by associating the start of a particular video signature set with the start of an audio signature set where the two signature sets are generated from a sequence of frames of video content and a sequence of segments of audio content that begin at substantially the same time. In this context, the starting times of video and audio content are considered to be substantially the same if a human observer has difficulty telling which content precedes the other. As another example, the alignment information may be represented by time stamps or time offsets that are associated with the video and audio signature sets and specify the relative timing of the underlying video content and audio content. If explicit alignment information is provided, it is passed along the path 390 for subsequent use by a resync device. No particular type of alignment information is critical.

FIG. 5 is a schematic block diagram of a part of an exemplary resync device 400 that may be used to restore the synchronization between streams of video and audio content. The resync device 400 includes a video signature generator 100 and an audio signature generator 200. The video signature generator 100 generates test video signature sets from streams of test video content received from the path 33. The audio signature generator 200 generates test audio signature sets from streams of test audio content received from the path 33. The content of these streams may have been modified and may not be properly synchronized with one another. The video signature generator 100 obtains test video location information that identifies the locations of the test video content used to generate the test video signature sets and it associates the test video location information with each respective test video signature set. The audio signature generator 200 obtains test audio location information that identifies the locations of the test audio content used to generate the test audio signature sets and it associates the test audio location information with each respective test audio signature set.

The content delay calculator 410 searches a rooted tree structure with leaf nodes that represent reference video signature sets to determine whether any of these reference signature sets is an exact or close match with a test video signature set. If a match is found, the reference video location of the associated reference video content is obtained from location information that is associated with the leaf node for the matching reference video signature set. A relative video timing difference between the test and reference video content is calculated from a difference between the reference video location and the test video location for the test video signature set. The relative video timing difference is passed to the relative delay calculator 430.

The content delay calculator 420 searches a rooted tree structure with leaf nodes that represent reference audio signature sets to determine whether any of these reference signature sets is an exact or close match with a test audio signature set. Preferably, a partial tree structure is used that includes nodes representing only those signature sets that correspond to one or more selected intervals of content as explained below. If a match is found, the reference audio location of the associated reference audio content is obtained from location information that is associated with the leaf node for the matching reference audio signature set. A relative audio timing difference between the test and reference audio content is calculated from a difference between the reference audio location and the test audio location for the test audio signature set. The relative audio timing difference is passed to the relative delay calculator 430.

The relative delay calculator 430 uses these relative timing differences to calculate an amount of delay that is needed to adjust either or both test video and audio streams to achieve proper synchronization. Any explicit alignment information for the reference content is received from the path 390 and is used in the delay calculation. Information representing this delay is passed along the path 490 for use by other equipment to implement the delay. For example, suppose the relative video timing difference indicates the reference video content precedes the corresponding test video content by four seconds and the relative audio timing difference indicates the reference audio content precedes the corresponding test audio content by five seconds. The relative delay calculator 430 can calculate an amount of delay equal to one second for the test video stream to achieve proper synchronization.

b) Partial Search Tree

The relative timing differences between test and reference content is usually much less than the duration of the entire reference content. For most implementations, the relative delay is no more than a few seconds; therefore, the search for a matching reference signature set can often be limited to a small number of reference signature sets that represent reference content within a few seconds of the test location specified for the test signature set. As a result, the efficiency of the synchronization application described above can be improved by using a partial rooted tree structure with nodes and links that represent only this small number of reference signature sets.

A partial tree structure that is suitable for use in the synchronization system described above may be constructed with nodes that correspond to signatures within a selected interval or window of a sequence of reference signatures. The entire sequence of reference signatures may include the signatures for any desired duration of content such as, for example, the audio signatures for one or more songs, or the audio or video signatures for all or a portion of one or more motion pictures.

Partial tree structures may be constructed prior to their use and stored as a set of pre-built trees. This approach reduces the amount of processing needed at the time the tree structures are used but it requires additional storage to record data representing the pre-built tree structures. Alternatively, a partial tree structure may be constructed at the time of its use. This alternative approach requires more processing at the time the tree structure is used but it minimizes the amount of storage needed to record data representing the tree structure. Each approach is discussed below.

Each intermediate node of the tree can correspond to one or more signatures in a signature set, or to only some of the data elements in one or more signatures in the series of signatures for a signature set. For ease of discussion and illustration, however, the following examples assume each intermediate node of a tree structure corresponds to one signature. The examples shown and illustrated also show trees with only a few levels and only a few nodes per level for illustrative simplicity.

(1) Pre-Built Tree Structure

A set of pre-built partial tree structures may be attractive in applications that repeatedly search the signature sets for a few intervals of reference content. This situation may exist in applications that check the identity of many streams of test content against only a few segments of reference content, or that make many corrections to the synchronization of test video/audio content using alignment information from only a few segments of reference video/audio content.

One method that may be used to construct a set of pre-built partial tree structures selects a plurality of intervals of reference signatures, constructs a tree structure for each of the intervals, records data that represents each tree structure, and constructs an index or other query mechanism that may be used to reference the data for each tree structure. For example, an index may include an identification of the associated reference content and the corresponding location of each respective interval of signatures within that reference content. Techniques disclosed above may be used to obtain and record the needed location information. At the time of use, the tree structure for a specified choice of reference content and location is accessed through the index.

(2) Incremental Tree Structure

The use of pre-built partial tree structures is usually not attractive in applications that need to search the signature sets for many different intervals of reference content. This situation may exist in applications that must check the identity of test content against many segments of reference content, or that make corrections to the synchronization of test video/audio content using alignment information from many segments of reference video/audio content.

One method that may be used to build a partial tree structure at the time of its use constructs the tree structure in incremental fashion by advancing a selection window along a sequence of reference signatures and updating nodes and links in the tree structure to represent only those reference signature sets that are wholly contained within the selection window. The signatures within the selection window are referred to here as selected signatures. The reference signature sets that are represented by the tree structure at any point are only those reference signature sets whose constituent signatures are all within the group of selected signatures.

In one exemplary implementation, each signature represents 10 msec. of content, each signature set includes 200 signatures, and adjacent signature sets start at locations that are offset from one another by one signature. The selection window is 500 signatures long and is advanced in a series of steps that are each one signature in length. In this particular implementation, the tree structure for each position of the selection window includes nodes and links that represent 301 signature sets. When the selection window is advanced by one signature, the oldest signature in the group of selected signatures is removed from the group and a new signature is added to the group. The tree structure is modified by removing all of the nodes and links that correspond to this oldest signature and that correspond to the signature set that includes the oldest signature, and by adding nodes and links to represent the new signature and the signature set that includes this new signature.

A simple example of a similar implementation is shown in FIGS. 10A to 12C. In this example, the signatures S1 to S12 comprise data elements with the following values:

S1 = 1
S2 = 2
S3 = 1
S4 = 4
S5 = 5
S6 = 1
S7 = 7
S8 = 8
S9 = 1
S10 = 7
S11 = 11
S12 = 12

Some signatures are assigned the same value so compressed nodes can be demonstrated.

Figure 10A:
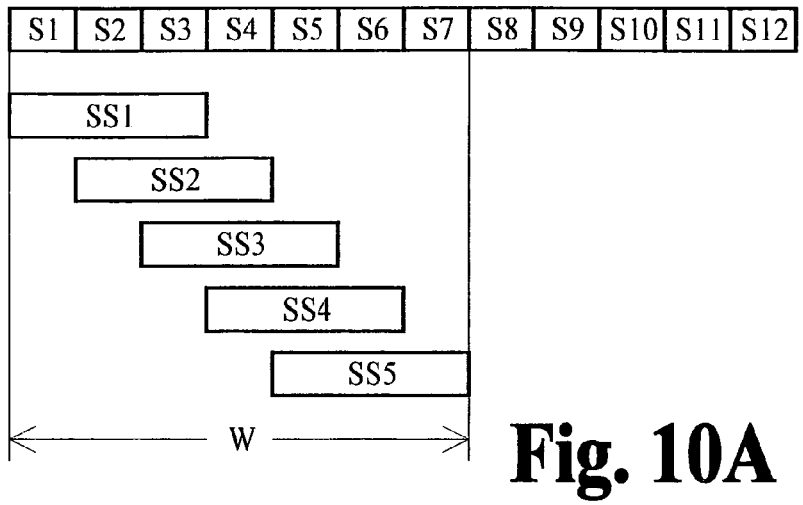
FIG. 10A is a schematic diagram of a sequence of signatures and signature sets.
Figure 10B:
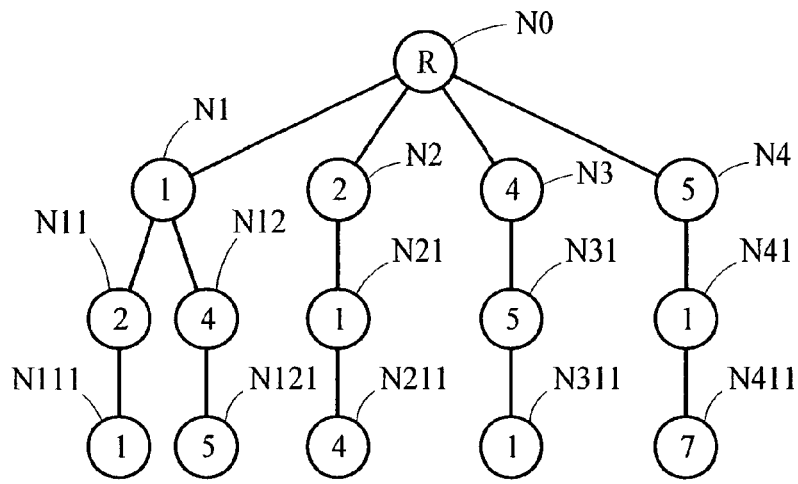
FIG. 10B is a schematic diagram of a search tree for the signature sets shown in FIG. 10A.

Referring to FIG. 10A, a selection window W defines a group of selected signatures that includes signatures S1 to S7. These signatures constitute a group of signature sets SS1 to SS5. Each signature set includes three signatures. The tree structure shown in FIG. 10B includes nodes and links that represent these five signature sets. The search criterion for each link is represented by the number that appears in the node at the lower end of the link. For example, the search criterion for the link between the root node N0 and the node N1 is 1 as shown by the number that appears in the node N1. The search criterion for the link between the node N1 and the node N11 is 2 and the search criterion for the link between the node N11 and the node N111 is 1.

The search criteria for the links along the path from the root node to a leaf node represent a sequence of signature values that constitute the signature set for that leaf node. For example, the leaf node N111 represents the signature set SS1 whose constitute signature values 1-2-1 correspond to the sequence of link criteria encountered along the path from the root node to that leaf node.

The leaf node N121 represents the signature set SS2 whose constitute signatures S3, S4 and S5 have the values 1, 4 and 5, respectively. The search criterion for the link from the root node N0 to the node N1 is equal to 1; therefore, this node lies along the paths to leaf nodes N111 and N121 that represent the signature sets SS1 and SS2. The other leaf nodes N211, N311 and N411 represent the signature sets SS3, SS4 and SS5, respectively.

Figure 10C:
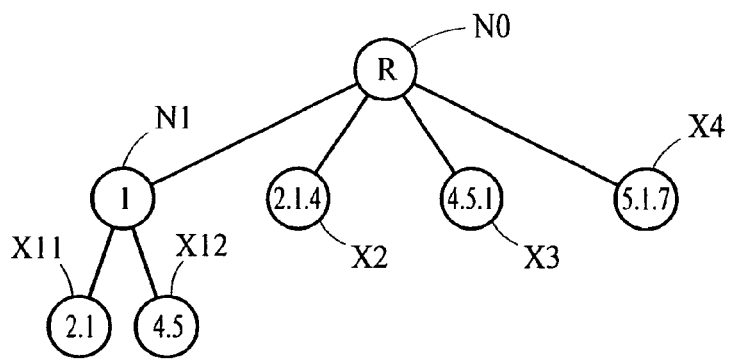
FIG. 10C is a schematic diagram of a search tree with compressed nodes that corresponds to the search tree shown in FIG. 10B.

Each of the leaf nodes in this example terminates a path in which one or more intermediate nodes have only one descendant. These intermediate nodes can be represented by compressed nodes as explained above. This is shown in FIG. 10C. The compressed node X11 represents the nodes N11 and N111. The compressed node X2 represents the nodes N2, N21 and N211. The compressed node X3 represents the nodes N3, N31 and N311. The compressed node X4 represents the nodes N4, N41 and N411. The link criteria for the nodes represented by a compressed node is shown by the symbols that appear in the compressed node. For example, the symbols "2.1.4" that appear in the node X2 represent the series of link criteria 2-1-4 that are encountered along the path from the root node N0 to the leaf node N211.

The tree structure shown in FIG. 10C represents the signature sets that include the group of signatures selected by the selection window W shown in FIG. 10A.

Figure 11A:
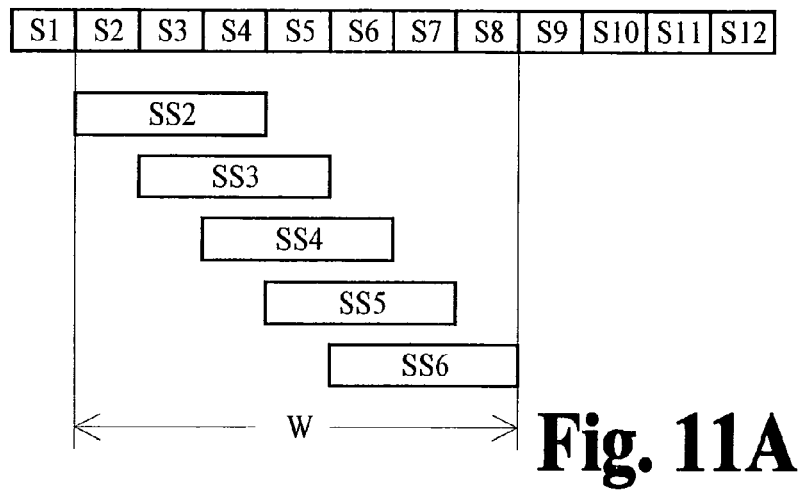
FIG. 11A is a schematic diagram of a sequence of signatures and signature sets.
Figure 11B:
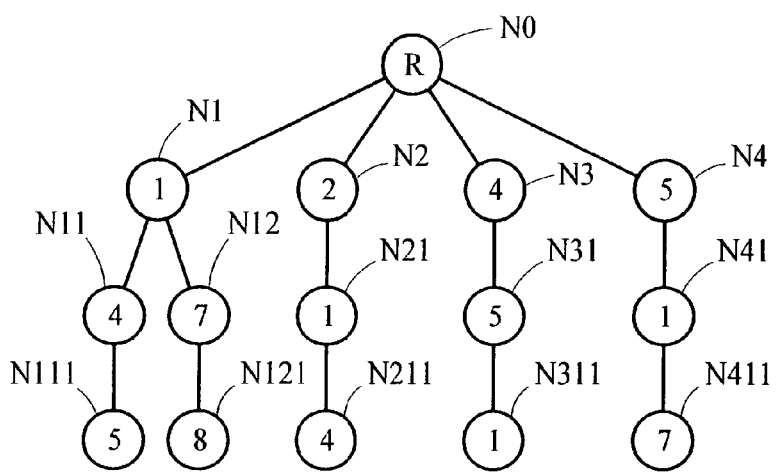
FIG. 11B is a schematic diagram of a search tree for the signature sets shown in FIG. 11A.
Figure 11C:
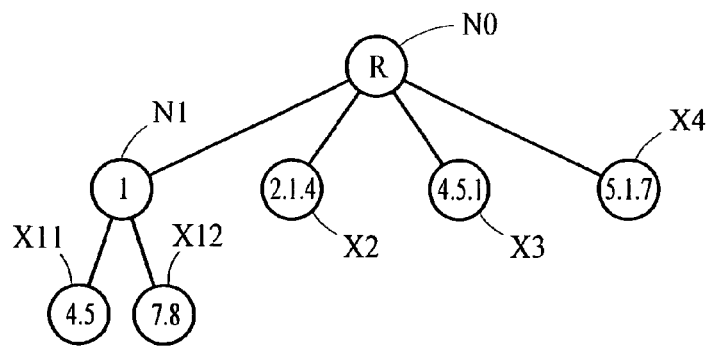
FIG. 11C is a schematic diagram of a search tree with compressed nodes that corresponds to the search tree shown in FIG. 11B.

After advancing the selection window W by one signature as shown in FIG. 11A, the selection window defines a group of selected signatures that includes signatures S2 to S8. The signature S1 is removed from the group of selected signatures and the signature S8 is added. The revised group of selected signatures constitute a different collection of signature sets SS2 to SS6. A tree structure that represents the new collection of signature sets is constructed incrementally by modifying the tree structure shown in FIG. 10B or FIG. 10C. This may be done by removing all individual nodes that represent the signature S1 and adding a node that represents the signature S8. If the tree contains compressed nodes, all compressed nodes that include a representation of the signature S1 must be modified. The result is shown in FIG. 11B. A corresponding tree with compressed nodes is shown in FIG. 11C. For this particular example, nodes under only the node N1 in FIG. 11B need to be modified. This corresponds to a modification of the compressed nodes under the node N1 as shown in FIG. 11C. Referring to FIG. 11C, the compressed node "4.5" replaces the former compressed node "2.1" and a new compressed node "7.8" is added.

Figure 12A:
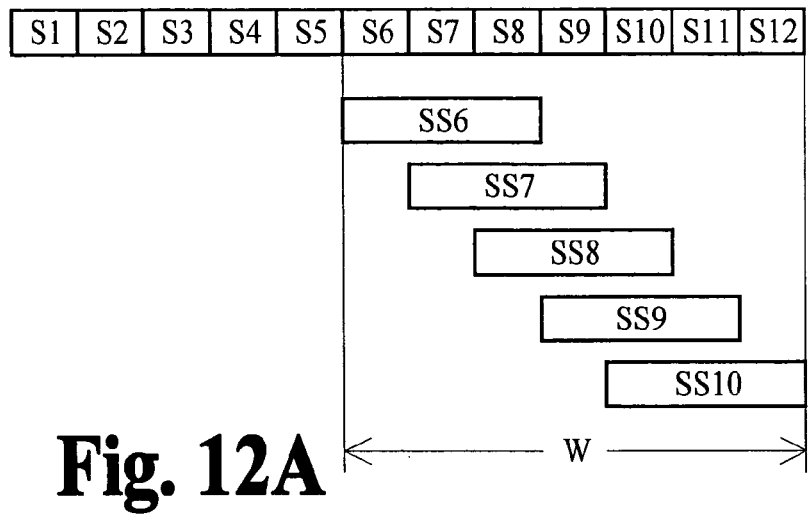
FIG. 12A is a schematic diagram of a sequence of signatures and signature sets.
Figure 12B:
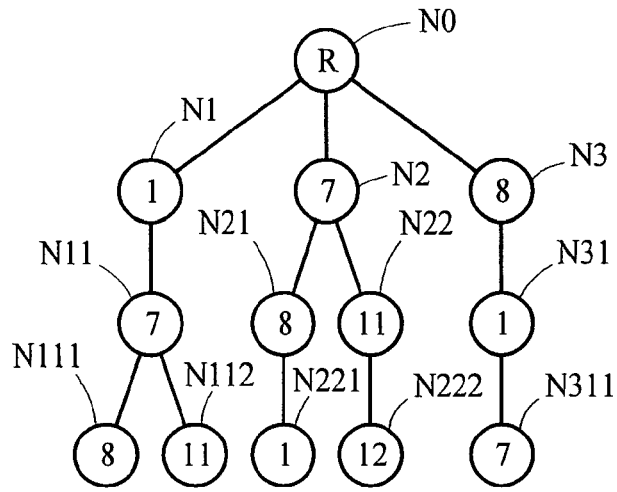
FIG. 12B is a schematic diagram of a search tree for the signature sets shown in FIG. 12A.
Figure 12C:
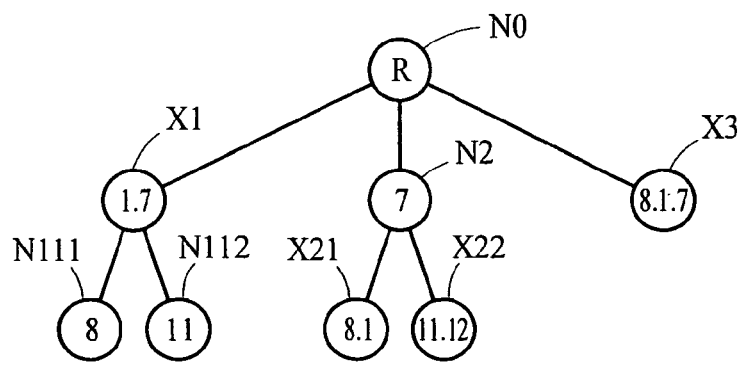
FIG. 12C is a schematic diagram of a search tree with compressed nodes that corresponds to the search tree shown in FIG. 12B.

The drawings shown in FIGS. 12A to 12C show the situation that exists after the selection window W is advanced to include signatures S6 to S12. The tree structure illustrated in FIG. 12B shows two leaf nodes N111 and N112 that share a common path between two intermediate nodes. The corresponding compressed node X1 is shown in FIG. 11C. Unlike the other compressed nodes shown in the figures, this compressed node does not include a leaf node.

These figures show tree structures that are built and modified in an incremental fashion as a selection window is advanced along a sequence of signatures. If compressed nodes are used, one or more compressed nodes may need to be modified to reflect changes in the signature sets that are represented by the tree. If the removal of a signature from the group of selected signatures reduces the number of descendants for a node to only one, either an existing compressed node is modified to include that node or a new compressed node is created to represent the node. Following the modifications, if two or more compressed nodes lie along the same path and are adjacent to one another, those compressed nodes may be combined into a single compressed node. If the addition of a signature to the group of selected signatures increases the number of descendants for a node to more than one, either an existing compressed node is modified to exclude that node or the existing compressed node is eliminated and the constituent nodes are represented individually. The net result of a modification to a compressed node may be two or more compressed nodes along the same path that are separated from one another by one or more individual nodes.

One method for incremental construction of a tree structure comprises:

(1) advancing a selection window along a sequence of reference signatures to define a group of selected reference signatures;

(2) identifying a new reference signature in the sequence of reference signatures that is newly within the selection window as a result of advancing the selection window;

(3) adding the new reference signature to the group of selected reference signatures;

(4) adding to a collection of reference signature sets a new reference signature set that comprises a series of reference signatures in the group of selected reference signatures that ends with the new reference signature;

(5) adding one or more new nodes including a new leaf node and one or more new links to the tree structure, where the new leaf node corresponds to the new reference signature set and the one or more new links connect other nodes in the tree structure to the one or more new nodes;

(6) identifying an old reference signature in the sequence of reference signatures that is newly outside the selection window as a result of advancing the selection window;

(7) removing the old reference signature from the group of selected reference signatures;

(8) removing from the collection of reference signature sets an old reference signature set that comprises a series of reference signatures that begins with the old reference signature; and (9) removing one or more old nodes including an old leaf node and one or more old links from the tree structure, where the old leaf node corresponds to the old reference signature set and the one or more old links connect other nodes in the tree structure to the one or more old nodes.

Alternative methods for the incremental construction of trees are possible. For example, the selection window may be advanced by amounts that represent two or more signatures, by amounts that exceed the length of a signature set, or by amounts that exceed the length of the selection window. If desired, the amount may be adapted.

D. Implementation

Figure 13:
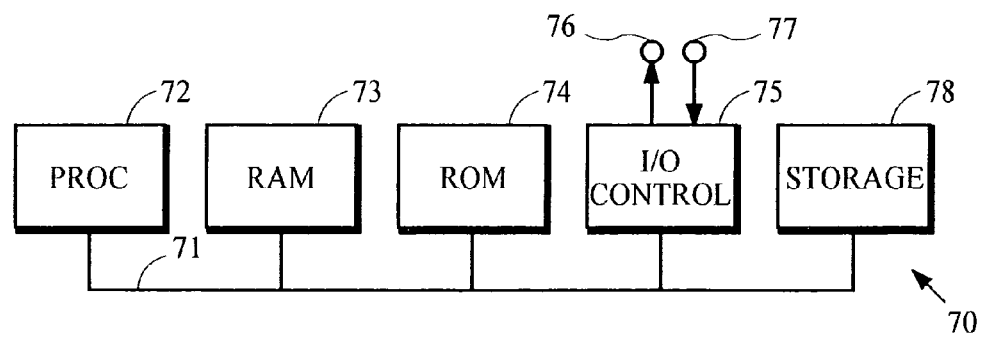
FIG. 13 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 13 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:

1. A method performed by a system of one or more computers for identifying test content representing visual or aural stimuli, the method comprising:

(a) the system of one or more computers advancing a selection window along a sequence of reference signatures by an interval equal to one or more reference signatures, wherein the reference signatures represent a sequence of segments of reference content representing visual or aural stimuli, and wherein the reference signatures within the selection window constitute a group of selected reference signatures;

(b) the system of one or more computers modifying nodes and links connecting the nodes in a rooted tree structure to reflect a changing membership of reference signature sets in a collection of reference signature sets, wherein each reference signature set in the collection of reference signature sets comprises a series of reference signatures within the group of selected reference signatures, the nodes in the rooted tree structure are associated with the reference signatures in the series of reference signatures, and some of the nodes are leaf nodes that each correspond to a respective reference signature set and wherein the nodes and links are modified by a process that comprises:

identifying a new reference signature in the sequence of reference signatures that is newly within the selection window as a result of advancing the selection window;

adding the new reference signature to the group of selected reference signatures;

adding a new reference signature set to the collection of reference signature sets, wherein the new reference signature set comprises a series of reference signatures in the group of selected reference signatures that ends with the new reference signature;

adding one or more new nodes including a new leaf node and one or more new links to the rooted tree structure, wherein the new leaf node corresponds to the new reference signature set and the one or more new links connect other nodes in the rooted tree structure to the one or more new nodes;

identifying an old reference signature in the sequence of reference signatures that is newly outside the selection window as a result of advancing the selection window;

removing the old reference signature from the group of selected reference signatures;

removing an old reference signature set from the collection of reference signature sets, wherein the old reference signature set comprises a series of reference signatures that begins with the old reference signature; and removing one or more old nodes including an old leaf node and one or more old links from the rooted tree structure, wherein the old leaf node corresponds to the old reference signature set and the one or more old links connect other nodes in the rooted tree structure to the one or more old nodes;

(c) the system of one or more computers obtaining a test signature set comprising a series of test signatures that represent a series of segments of the test content;

(d) the system of one or more computers traversing the links to determine if a matching leaf node exists in the rooted tree structure that corresponds to a reference signature set and provides a level of similarity with the test signature set that exceeds a threshold; and (e) the system of one or more computers generating a match-status signal that indicates whether the matching node exists in the rooted tree structure.

2. The method according to claim 1 that comprises the system of one or more computers obtaining reference location information associated with the matching leaf node that identifies a corresponding location within the sequence of segments of reference content.

3. The method according to claim 2 wherein the reference location information specifies a corresponding location in the sequence of reference signatures.

4. The method according to claim 3 wherein the corresponding location in the sequence of reference signatures is the location of a specified signature in a series of signatures constituting the reference signature set represented by the matching leaf node.

5. The method according to claim 2 that comprises:
the system of one or more computers obtaining test location information associated with the test signature set that identifies a corresponding location within the sequence of segments of test content;
the system of one or more computers deriving an offset between locations identified by the reference location information and the test location information; and
the system of one or more computers generating a signal representing the offset.

6. A method performed by a system of one or more computers for constructing tree structures for use in identifying content representing visual or aural stimuli, the method comprising:
(a) the system of one or more computers establishing a selection window at a position within a sequence of reference signatures that represent a sequence of segments of reference content representing visual or aural stimuli, wherein the reference signatures within the selection window constitute a group of selected reference signatures that represent a portion of the reference content;
(b) the system of one or more computers constructing a rooted tree structure comprising a root, a plurality of nodes and a plurality of links connecting the nodes to reflect membership of reference signature sets in a collection of reference signature sets, wherein each reference signature set in the collection of reference signature sets comprises a series of reference signatures within the group of selected reference signatures, the nodes in the rooted tree structure are associated with the reference signatures in the series of reference signatures, and some of the nodes are leaf nodes that each correspond to a respective reference signature set;
(c) the system of one or more computers recording a data structure that represents the root, the nodes and the links in the rooted tree structure;
(d) the system of one or more computers recording a position index that represents the position of the selection window within the sequence of reference signatures and that refers to the data structure; and
(e) the system of one or more computers repeating steps (a) through (d) to construct a plurality of rooted tree structures for a plurality of selection window positions for different portions of the reference content and to record respective data structures and position indexes representing the plurality of rooted tree structures and the plurality of selection window positions, wherein:

the repeating of step (a) establishes a plurality of selection window positions by advancing the selection window along the sequence of reference signatures by an interval that is less than the selection window length such that the selection windows for adjacent positions overlap one another; and the repeating of step (b) comprises:
identifying a new reference signature in the sequence of reference signatures that is newly within the selection window as a result of advancing the selection window;
adding the new reference signature to the group of selected reference signatures;
adding a new reference signature set to the collection of reference signature sets, wherein the new reference signature set comprises a series of reference signatures in the group of selected reference signatures that ends with the new reference signature;
adding one or more new nodes including a new leaf node and one or more new links to the rooted tree structure, wherein the new leaf node corresponds to the new reference signature set and the one or more new links connect other nodes in the rooted tree structure to the one or more new nodes;
identifying an old reference signature in the sequence of reference signatures that is newly outside the selection window as a result of advancing the selection window;
removing the old reference signature from the group of selected reference signatures;
removing an old reference signature set from the collection of reference signature sets, wherein the old reference signature set comprises a series of reference signatures that begins with the old reference signature; and
removing one or more old nodes including an old leaf node and one or more old links from the rooted tree structure, wherein the old leaf node corresponds to the old reference signature set and the one or more old links connect other nodes in the rooted tree structure to the one or more old nodes.

7. The method according to claim 6 that comprises the system of one or more computers recording reference location information for each leaf node that identifies a corresponding location within the sequence of segments of reference content.

8. The method according to claim 7 wherein the reference location information specifies a corresponding location in the sequence of reference signatures.

9. The method according to claim 8 wherein the corresponding location in the sequence of reference signatures is the location of a specified signature in a series of signatures constituting the reference signature set represented by a respective leaf node.

10. A non-transitory storage medium that records a program of instructions executable by a device to perform a method for identifying test content representing visual or aural stimuli, wherein the method comprises:
(a) advancing a selection window along a sequence of reference signatures by an interval equal to one or more reference signatures, wherein the reference signatures represent a sequence of segments of reference content representing visual or aural stimuli, and wherein the reference signatures within the selection window constitute a group of selected reference signatures;
(b) modifying nodes and links connecting the nodes in a rooted tree structure to reflect a changing membership of reference signature sets in a collection of reference signature sets, wherein each reference signature set in the collection of reference signature sets comprises a series of reference signatures within the group of selected reference signatures, the nodes in the rooted tree structure are associated with the reference signatures in the series of reference signatures, and some of the nodes are leaf nodes that each correspond to a respective reference signature set and wherein the nodes and links are modified by a process that comprises:

identifying a new reference signature in the sequence of reference signatures that is newly within the selection window as a result of advancing the selection window;

adding the new reference signature to the group of selected reference signatures;

adding a new reference signature set to the collection of reference signature sets, wherein the new reference signature set comprises a series of reference signatures in the group of selected reference signatures that ends with the new reference signature;

adding one or more new nodes including a new leaf node and one or more new links to the rooted tree structure, wherein the new leaf node corresponds to the new reference signature set and the one or more new links connect other nodes in the rooted tree structure to the one or more new nodes;

identifying an old reference signature in the sequence of reference signatures that is newly outside the selection window as a result of advancing the selection window;

removing the old reference signature from the group of selected reference signatures;

removing an old reference signature set from the collection of reference signature sets, wherein the old reference signature set comprises a series of reference signatures that begins with the old reference signature; and removing one or more old nodes including an old leaf node and one or more old links from the rooted tree structure, wherein the old leaf node corresponds to the old reference signature set and the one or more old links connect other nodes in the rooted tree structure to the one or more old nodes;

(c) obtaining a test signature set comprising a series of test signatures that represent a series of segments of the test content;

(d) traversing the links to determine if a matching leaf node exists in the rooted tree structure that corresponds to a reference signature set and provides a level of similarity with the test signature set that exceeds a threshold; and (e) generating a match-status signal that indicates whether the matching node exists in the rooted tree structure.

11. The medium according to claim 10, wherein the method comprises obtaining reference location information associated with the matching leaf node that identifies a corresponding location within the sequence of segments of reference content.

12. The medium according to claim 11 wherein the reference location information specifies a corresponding location in the sequence of reference signatures.

13. The medium according to claim 12 wherein the corresponding location in the sequence of reference signatures is the location of a specified signature in a series of signatures constituting the reference signature set represented by the matching leaf node.

14. The medium according to claim 11, wherein the method comprises:

obtaining test location information associated with the test signature set that identifies a corresponding location within the sequence of segments of test content;

deriving an offset between locations identified by the reference location information and the test location information; and generating a signal representing the offset.

15. A non-transitory storage medium that records a program of instructions executable by a device to perform a method for constructing tree structures for use in identifying content representing visual or aural stimuli, wherein the method comprises:

(a) establishing a selection window at a position within a sequence of reference signatures that represent a sequence of segments of reference content representing visual or aural stimuli, wherein the reference signatures within the selection window constitute a group of selected reference signatures that represent a portion of the reference content;

(b) constructing a rooted tree structure comprising a root, a plurality of nodes and a plurality of links connecting the nodes to reflect membership of reference signature sets in a collection of reference signature sets, wherein each reference signature set in the collection of reference signature sets comprises a series of reference signatures within the group of selected reference signatures, the nodes in the rooted tree structure are associated with the reference signatures in the series of reference signatures, and some of the nodes are leaf nodes that each correspond to a respective reference signature set;

(c) recording a data structure that represents the root, the nodes and the links in the rooted tree structure;

(d) recording a position index that represents the position of the selection window within the sequence of reference signatures and that refers to the data structure; and (e) repeating steps (a) through (d) to construct a plurality of rooted tree structures for a plurality of selection window positions for different portions of the reference content and to record respective data structures and position indexes representing the plurality of rooted tree structures and the plurality of selection window positions, wherein:

the repeating of step (a) establishes a plurality of selection window positions by advancing the selection window along the sequence of reference signatures by an interval that is less than the selection window length such that the selection windows for adjacent positions overlap one another; and the repeating of step (b) comprises:

identifying a new reference signature in the sequence of reference signatures that is newly within the selection window as a result of advancing the selection window;

adding the new reference signature to the group of selected reference signatures;

adding a new reference signature set to the collection of reference signature sets, wherein the new reference signature set comprises a series of reference signatures in the group of selected reference signatures that ends with the new reference signature;

adding one or more new nodes including a new leaf node and one or more new links to the rooted tree structure, wherein the new leaf node corresponds to the new reference signature set and the one or more new links connect other nodes in the rooted tree structure to the one or more new nodes;

identifying an old reference signature in the sequence of reference signatures that is newly outside the selection window as a result of advancing the selection window;

removing the old reference signature from the group of selected reference signatures;

removing an old reference signature set from the collection of reference signature sets, wherein the old reference signature set comprises a series of reference signatures that begins with the old reference signature; and removing one or more old nodes including an old leaf node and one or more old links from the rooted tree structure, wherein the old leaf node corresponds to the old reference signature set and the one or more old links connect other nodes in the rooted tree structure to the one or more old nodes.

16. The medium according to claim 15, wherein the method comprises recording reference location information for each leaf node that identifies a corresponding location within the sequence of segments of reference content.

17. The medium according to claim 16 wherein the reference location information specifies a corresponding location in the sequence of reference signatures.

18. The medium according to claim 17 wherein the corresponding location in the sequence of reference signatures is the location of a specified signature in a series of signatures constituting the reference signature set represented by a respective leaf node.

19. An apparatus for identifying test content representing visual or aural stimuli, the apparatus comprising:

(a) means for advancing a selection window along a sequence of reference signatures by an interval equal to one or more reference signatures, wherein the reference signatures represent a sequence of segments of reference content representing visual or aural stimuli, and wherein the reference signatures within the selection window constitute a group of selected reference signatures;

(b) means for modifying nodes and links connecting the nodes in a rooted tree structure to reflect a changing membership of reference signature sets in a collection of reference signature sets, wherein each reference signature set in the collection of reference signature sets comprises a series of reference signatures within the group of selected reference signatures, the nodes in the rooted tree structure are associated with the reference signatures in the series of reference signatures, and some of the nodes are leaf nodes that each correspond to a respective reference signature set and wherein the nodes and links are modified by a process that comprises:

identifying a new reference signature in the sequence of reference signatures that is newly within the selection window as a result of advancing the selection window;

adding the new reference signature to the group of selected reference signatures;

adding a new reference signature set to the collection of reference signature sets, wherein the new reference signature set comprises a series of reference signatures in the group of selected reference signatures that ends with the new reference signature;

adding one or more new nodes including a new leaf node and one or more new links to the rooted tree structure, wherein the new leaf node corresponds to the new reference signature set and the one or more new links connect other nodes in the rooted tree structure to the one or more new nodes;

identifying an old reference signature in the sequence of reference signatures that is newly outside the selection window as a result of advancing the selection window;

removing the old reference signature from the group of selected reference signatures;

removing an old reference signature set from the collection of reference signature sets, wherein the old reference signature set comprises a series of reference signatures that begins with the old reference signature; and removing one or more old nodes including an old leaf node and one or more old links from the rooted tree structure, wherein the old leaf node corresponds to the old reference signature set and the one or more old links connect other nodes in the rooted tree structure to the one or more old nodes;

(c) means for obtaining a test signature set comprising a series of test signatures that represent a series of segments of the test content;

(d) means for traversing the links to determine if a matching leaf node exists in the rooted tree structure that corresponds to a reference signature set and provides a level of similarity with the test signature set that exceeds a threshold; and (e) means for generating a match-status signal that indicates whether the matching node exists in the rooted tree structure.

20. The apparatus according to claim 19 that comprises means for obtaining reference location information associated with the matching leaf node that identifies a corresponding location within the sequence of segments of reference content.

21. The apparatus according to claim 20 wherein the reference location information specifies a corresponding location in the sequence of reference signatures.

22. The apparatus according to claim 21 wherein the corresponding location in the sequence of reference signatures is the location of a specified signature in a series of signatures constituting the reference signature set represented by the matching leaf node.

23. The apparatus according to claim 20 that comprises:

means for obtaining test location information associated with the test signature set that identifies a corresponding location within the sequence of segments of test content;

means for deriving an offset between locations identified by the reference location information and the test location information; and means for generating a signal representing the offset.

24. An apparatus for constructing tree structures for use in identifying content representing visual or aural stimuli, the apparatus comprising:

(a) means for establishing a selection window at a position within a sequence of reference signatures that represent a sequence of segments of reference content representing visual or aural stimuli, wherein the reference signatures within the selection window constitute a group of selected reference signatures that represent a portion of the reference content;

(b) means for constructing a rooted tree structure comprising a root, a plurality of nodes and a plurality of links connecting the nodes to reflect membership of reference signature sets in a collection of reference signature sets, wherein each reference signature set in the collection of reference signature sets comprises a series of reference signatures within the group of selected reference signatures, the nodes in the rooted tree structure are associated with the reference signatures in the series of reference signatures, and some of the nodes are leaf nodes that each correspond to a respective reference signature set;

(c) means for recording a data structure that represents the root, the nodes and the links in the rooted tree structure;

(d) means for recording a position index that represents the position of the selection window within the sequence of reference signatures and that refers to the data structure; and (e) means for repeating steps (a) through (d) to construct a plurality of rooted tree structures for a plurality of selection window positions for different portions of the reference content and to record respective data structures and position indexes representing the plurality of rooted tree structures and the plurality of selection window positions, wherein:

the repeating of step (a) establishes a plurality of selection window positions by advancing the selection window along the sequence of reference signatures by an interval that is less than the selection window length such that the selection windows for adjacent positions overlap one another; and the repeating of step (b) comprises:

identifying a new reference signature in the sequence of reference signatures that is newly within the selection window as a result of advancing the selection window;

adding the new reference signature to the group of selected reference signatures;

adding a new reference signature set to the collection of reference signature sets, wherein the new reference signature set comprises a series of reference signatures in the group of selected reference signatures that ends with the new reference signature;

adding one or more new nodes including a new leaf node and one or more new links to the rooted tree structure, wherein the new leaf node corresponds to the new reference signature set and the one or more new links connect other nodes in the rooted tree structure to the one or more new nodes;

identifying an old reference signature in the sequence of reference signatures that is newly outside the selection window as a result of advancing the selection window;

removing the old reference signature from the group of selected reference signatures;

removing an old reference signature set from the collection of reference signature sets, wherein the old reference signature set comprises a series of reference signatures that begins with the old reference signature; and removing one or more old nodes including an old leaf node and one or more old links from the rooted tree structure, wherein the old leaf node corresponds to the old reference signature set and the one or more old links connect other nodes in the rooted tree structure to the one or more old nodes.

25. The apparatus according to claim 24 that comprises means for recording reference location information for each leaf node that identifies a corresponding location within the sequence of segments of reference content.

26. The apparatus according to claim 25 wherein the reference location information specifies a corresponding location in the sequence of reference signatures.

27. The apparatus according to claim 26 wherein the corresponding location in the sequence of reference signatures is the location of a specified signature in a series of signatures constituting the reference signature set represented by a respective leaf node.

* * * * *